United States Patent
Abel et al.

(10) Patent No.: US 7,978,690 B2
(45) Date of Patent: Jul. 12, 2011

(54) METHOD TO OPERATE A CROSSBAR SWITCH

(75) Inventors: Francois G. Abel, Rueschlikon (CH);
Mircea Gusat, Langnau am Albis (CH);
Rajaram B. Krishnamurthy, Poughkeepsie, NY (US); Cyriel Minkenberg, Gutenswil (CH)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 12/079,854

(22) Filed: Mar. 28, 2008

(65) Prior Publication Data
US 2008/0247411 A1      Oct. 9, 2008

(30) Foreign Application Priority Data
Mar. 31, 2007   (EP) ..................................... 07006759

(51) Int. Cl.
*H04L 12/50* (2006.01)
*H04Q 11/00* (2006.01)
(52) U.S. Cl. ......... 370/360; 370/412; 370/413; 370/419
(58) Field of Classification Search .................. 370/359, 370/360, 367, 387, 388, 412, 413, 419
See application file for complete search history.

(56) References Cited

U.S. PATENT DOCUMENTS

| | | | | |
|---|---|---|---|---|
| 5,124,978 A | * | 6/1992 | Chao | 370/422 |
| 5,168,492 A | * | 12/1992 | Beshai et al. | 370/353 |
| 5,218,602 A | * | 6/1993 | Grant et al. | 370/390 |
| 5,237,567 A | * | 8/1993 | Nay et al. | 370/438 |
| 5,261,058 A | * | 11/1993 | Squires et al. | 710/1 |
| 5,317,565 A | * | 5/1994 | Crouse et al. | 370/354 |
| 5,535,197 A | * | 7/1996 | Cotton | 370/395.72 |
| 5,910,928 A | * | 6/1999 | Joffe | 365/230.05 |
| 5,991,295 A | * | 11/1999 | Tout et al. | 370/395.7 |
| 6,487,171 B1 | * | 11/2002 | Honig et al. | 370/235 |
| 6,542,502 B1 | * | 4/2003 | Herring et al. | 370/390 |
| 6,553,030 B2 | * | 4/2003 | Ku et al. | 370/390 |
| 6,574,232 B1 | * | 6/2003 | Honig et al. | 370/413 |
| 6,597,656 B1 | * | 7/2003 | Blanc et al. | 370/219 |
| 6,999,453 B1 | * | 2/2006 | Chemla et al. | 370/389 |
| 7,031,330 B1 | * | 4/2006 | Bianchini, Jr. | 370/412 |
| 7,349,393 B2 | * | 3/2008 | Pierson | 370/392 |

(Continued)

OTHER PUBLICATIONS

Dally, William, et al, "The Reliable Router: A Reliable and High-Performance Communication Substrate for Parallel Computers", Lecture Notes in Computer Science, vol. 853, pp. 241-255 (1994).
Galles, Mike, "Spider: A High-Speed Network Interconnect". IEEE Micro, pp. 34-39, Jan./Feb. 1997.

(Continued)

*Primary Examiner* — Aung S Moe
*Assistant Examiner* — Benjamin Elliott
(74) *Attorney, Agent, or Firm* — William Stock; Anne Vachon Dougherty

(57) ABSTRACT

A method is described to operate a crossbar switch comprising a crossbar fabric with N sending and M receiving ports, with port cards connected to at least one sending and/or receiving port each of the crossbar fabric, said crossbar switch further comprising a control unit connected with the port cards via discrete control channel links, wherein C ports are clustered on a single receiving port card so that such a receiving port card in a single time-step can receive up to C data cells from C sending port cards simultaneously. According to said method the control channel links are used to relay up to C acknowledgements between at least one receiving port card and at least one sending port card.

4 Claims, 6 Drawing Sheets

U.S. PATENT DOCUMENTS

| | | | |
|---|---|---|---|
| 7,359,326 B1 * | 4/2008 | Harper et al. | 370/235 |
| 7,499,464 B2 * | 3/2009 | Ayrapetian et al. | 370/419 |
| 7,724,733 B2 * | 5/2010 | Benner et al. | 370/389 |
| 2003/0031197 A1 * | 2/2003 | Schmidt | 370/462 |
| 2004/0062242 A1 * | 4/2004 | Wadia et al. | 370/390 |
| 2007/0091894 A1 * | 4/2007 | Kang et al. | 370/394 |
| 2008/0247411 A1 * | 10/2008 | Abel et al. | 370/419 |

OTHER PUBLICATIONS

Galles, "Spider: A High-Speed Network Interconnect", IEEE Micro, vol. 17, No. 1, pp. 34-39, Jan./Feb. 1997.

Dally, et al, "The Reliable Router: A Reliable and High-Performance Communication Substrate for Parallel Computers", 1st IWPCRC, pp. 241-255 (May 2004).

* cited by examiner (State of the Art)

METHOD TO OPERATE A CROSSBAR SWITCH

TECHNICAL FIELD

The invention relates to a method to operate a crossbar switch comprising a crossbar fabric with N sending and M receiving ports, such as that used within an interconnection network connecting cache lines of multi-core computer systems. The invention further relates to a crossbar switch.

BACKGROUND OF THE INVENTION

An interconnection network, such as an interconnection network used to switch data cells or data packets in a high-performance computing system (HPC) comprises, compute nodes interconnected by crossbar switches. A crossbar switch typically comprises a crossbar fabric with N input ports and M output ports. If N=M this is called a symmetric crossbar fabric. A more general case of a crossbar fabric is an asymmetric crossbar fabric with N input ports and M output ports, wherein N is unequal to M. Such an asymmetric crossbar fabric is part of a so-called N×M switch. If C is the physical co-location or clustering factor, then the asymmetric crossbar fabric has M/C, which typically is equal to N, cluster ports, where C ports are clustered or co-located on the same physical port-card for performance and reduced contention. Each of the C ports on a clustered port-card can receive data cells from C out of N input ports in the same time-step or cycle. A control unit, also called arbiter or scheduler, that is also part of the crossbar switch, provides that this happens. An asymmetric crossbar fabric becomes a symmetric crossbar fabric when N is equal to M, i.e. N=M.

In a crossbar switch, port cards transmit data cells to other port cards. Data cell headers carry sequence numbers for reliability and ordering. A sending port card transmits data cells to a receiving port card and holds data cells that are unacknowledged. If a receiving port card receives a data cell without an error, an acknowledgement (ACK) is routed to the sending port card. When this acknowledgement is received by the sending port card, the unacknowledged data cell is released from the sending port card's memory. If a data cell is received in error at the receiving port card and so communicated to the sending port card, the data cell may be retransmitted by the sending port card. If a time-out expires at the sending port card before the corresponding acknowledgement is received at the sending port card, the sending port card may also retransmit data cells to the receiving port card.

A crossbar switch 1 according to the state of the art is shown in FIG. 1. The crossbar switch 1 comprises an asymmetric crossbar fabric 2 with two sending port cards 3, 4 and one receiving port card 5 connected via said crossbar fabric 2. The crossbar switch 1 further comprises a control unit (arbiter) 6 connected with the sending port cards 3, 4 via discrete control channel links 7. The control unit 6 is clocking the sending ports connected with the sending port cards 3, 4 and the receiving ports connected with the receiving port card 5 and further controls which port cards 3, 4, 5 exchange data cells with each other. Links 9 to and from the crossbar fabric 2 are called data channel links, while links 7 between the control unit 6 and the port cards 3, 4, 5 are called control channel links. Within the crossbar switch 1, the sending port cards 3 and 4 can send data cells to the receiving port card 5 across the crossbar fabric 2. Thereby the receiving port card 5 can receive a data cell from the sending port card 3 as well as from the sending port card 4 in the same cycle. The receiving port card 5 has only one transmitter connected via a transmitter link 8 with the crossbar fabric 2. If the receiving port card 5 wants to acknowledge data cells from the sending port card 3 as well as from the sending port card 4, then it transmits acknowledgements to the sending port cards 3 and 4 in succession in subsequent cycles. These acknowledgements also occupy bandwidth within the crossbar fabric 2. The bandwidth provided for data cells within the crossbar fabric 2 is reduced by the acknowledgements. It is also customary to cumulatively acknowledge the receipt of data cells from the sending port cards 3, 4. In this case, valuable buffer space is needed at the sending port cards 3,4 to hold unacknowledged data cells until the cumulative acknowledgement arrives. For interconnection networks that have many-to-one traffic patterns, the receiving port card 5 has to wait for a data cell to piggyback the cumulative acknowledgement. This can further aggravate buffering needs at the sending ports. Crossbar fabric 2 of FIG. 1 can be optical with arbiter 6 providing electrical or optical control. Similarly, crossbar fabric 2 of FIG. 1 can be electrical and arbiter 6 providing electrical control.

Using the state of the art's crossbar switches, there are successive acknowledgement transmissions in the case of asymmetric crossbar fabrics with a co-location or clustering factor C, wherein C successive transmissions are needed to reach a sending port card assuming that C sending port cards transmit data cells within the same cycle to a clustered or co-located port on the same physical receiving port-card. Increased buffer space at the sending port cards is also required. In addition, data cell piggybacked cumulative acknowledgements require additional buffer space at the sender as the sender must wait for the cumulative acknowledgement piggybacked on a data cell from the receiver to the sender.

Daily et al, "The Reliable Router: A Reliable and High-Performance Communication Substrate for Parallel Computers", first International Workshop on Parallel Computing Routing and Communications, Seattle, Wash., May 1994, describes a reliability mechanism using multiple data packet copies and a unique token. Two copies of each data packet and a token are required that transfer from switch to switch. This removes the need for source buffering at the input compute node and removes acknowledgements from the data channel, but comes at the expense of higher data channel bandwidth due to multiple data copies and logic to remove duplicates at the destination node. This work is relevant for mesh-based networks and is inefficient for arbitrary topology packet networks.

In the Galles article entitled, "Spider: A High-Speed Network Interconnect," *IEEE Micro*, Vol. 17, No. 1, pp. 34-39, January/February, 1997, an interconnection network using an electrical switch to switch data cells/packets is known. Intra-switch packet communication reliability uses a Cyclic Redundancy Check (CRC) to be checked on packet arrival and again at packet egress. Packets at egress that have failed CRC are stamped with a code, yet sent out on the link consuming precious bandwidth as no intra-switch ACKs are supported. The switch uses link-level retransmissions to ensure reliability for inter-switch communication. A sender port uses a go-back-n retransmission policy with ACKs being carried on the data channel links between switches. The switch uses link-to-link retransmission rather than end-to-end retransmission (from source compute node to destination compute node) to allow packet header modifications enroute to the destination compute node. Such modifications enroute to the destination are critical for superior traffic management cognizant of current network loading conditions, adaptive routing and packet aging.

In summary within a crossbar switch according to the state of the art two main drawbacks arise. First, one receiving port card can receive C data cells of multiple sending port cards during one cycle but due to its connection with only one clustered port of the crossbar fabric, it needs C cycles to acknowledge the C data cells. A main shortcoming of this is that the sending port cards may have to wait for up to C transmissions from the receiver port card to release the transmitted cell. Note that each cell can be transmitted only after arbitration successfully completes. A second drawback is that if acknowledgements from a receiving port card to a sending port card are carried on the data channel, this leads to a reduced bandwidth provided to data cell transmission, if the data channel bandwidth is fixed, or leads to increased data channel bandwidth to provide a constant bandwidth for data cell transmission. Moreover, if data cells are cumulatively acknowledged (i.e. each data cell is not acknowledged on a per cell basis but rather grouped over a range of sequence numbers) then increased buffer space is indicated at the sender to wait for the cumulative acknowledgement.

It is thus an object of the invention to provide another method to operate a crossbar switch. It is a further object of the invention to provide a method to operate a crossbar switch comprising a crossbar fabric with N sending and M receiving ports with port cards housing each sending and receiving port, which method provides increased bandwidth for transmitting data cells via said crossbar fabric and which method allows to acknowledge data cells received within the same cycle from different sending ports, in order to reduce buffer space at the sending port cards. It is further an object of the invention to provide a crossbar switch with an increased bandwidth for data cell transmission.

SUMMARY OF THE INVENTION

A first aspect of the invention relates to a method to operate a crossbar switch, which crossbar switch comprises a crossbar fabric with N sending and M receiving ports, with port cards coupled or connected to at least one sending and/or receiving port each of the crossbar fabric, said crossbar switch further comprising a control unit connected with or coupled to the port cards via discrete control channel links that are independent of the crossbar fabric, wherein C ports are clustered on a single receiving port card so that such a receiving port card in a single cycle defined by a time step can receive up to C data cells from C sending port cards simultaneously, and wherein each sending port card comprises a buffer space storing each data cell sent until an acknowledgement is received. The control channel links are used to relay acknowledgements between the port cards.

This provides the advantage of an increased bandwidth for transmitting data cells via said crossbar fabric. It has the further advantage that the buffer space at the sending port cards can be reduced by allowing a receiving port card to acknowledge data cells received from different sending port cards within the same time-step or cycle. As acknowledgements are routed via the control channel links and not via the e.g. crossbar fabric, the method according to the invention provides an increased bandwidth within the crossbar fabric for data cells. Another advantage of the invention is that the method allows a reliable data cell delivery within a crossbar switch.

According to a preferred embodiment of the method according to the invention, at least one acknowledgement from a receiving port card to at least one sending port card on the control channel link is piggybacked directly on a control channel cell in the same cycle or time step. Unlike according to the state of the art, there is no need to transmit C acknowledgements for C data cells received in a single cycle, within C successive cycles, if C ports are clustered on the same receiving port card. Since piggybacking acknowledgements to be sent via the discrete control channel links does not narrow the bandwidth provided to exchange data cells via the crossbar fabric, a limitation of the number of acknowledgements to be piggybacked is only given by the physical limitations of the control channel links.

According to another preferred embodiment of the method according to the invention, piggybacked acknowledgements after being sent from a receiving port card are split to discrete acknowledgements before forwarding the acknowledgements to the corresponding sending port cards.

The crossbar switch can be an electrically controlled electrical switch, an optically controlled optical switch or an electrically controlled optical switch. The crossbar switch can be a symmetric one with N equal to M or an asymmetric one with N unequal to M.

A second aspect of the invention relates to a crossbar switch comprising a crossbar fabric with N sending and M receiving ports, with port cards coupled to at least one sending and/or receiving port each of the crossbar fabric and with a control unit coupled to the port cards via discrete control channel links that are independent of the crossbar fabric. Thereby C ports are clustered on a single receiving port card so that such a receiving port card in a single cycle defined by a time step can receive C data cells from C sending port cards to be acknowledged simultaneously. Each sending port card comprises a buffer space storing each data cell sent until an acknowledgement is received. Said crossbar switch comprises means to use the control channel links to relay acknowledgements between the port cards. The crossbar switch according to this aspect of the invention provides an increased bandwidth for transmitting data cells via said crossbar fabric. The crossbar switch according to the invention allows benefiting all the advantages of the method mentioned above. Doing so also a crossbar switch with a reliable data cell delivery is provided.

According to a preferred embodiment of the crossbar switch according to the invention, said means to use the control channel links to relay acknowledgements between the port cards comprise a reliable delivery queue (RDQ) and acknowledgement match unit on each sending port card, which enqueues descriptor entries corresponding to entries in a retransmission queue at the sending port card, maintains a deterministic timestamp set at a current time plus a round-trip time (RTT) loaded into each descriptor entry stored in the reliable delivery queue (RDQ). Round-trip time is the time between a data cell being transmitted on the data channel and the corresponding acknowledgement arriving at the sender from the receiver. Each of the acknowledgments from the receiver carry the sequence number of the data cell received from the sender without error. Retransmissions from the sender are triggered when the current time exceeds retransmission deadline stored in the head-of-line packets in the RDQ and/or when missing sequence numbers are noticed in acknowledgements from the receiver.

According to another preferred embodiment of the crossbar switch according to the invention, said means to use the control channel links to relay acknowledgements between the port cards comprise a fuse and forward unit on each receiving port card, which extracts sequence numbers and source port identification numbers (IDs) from data cells received, fuses this data and piggybacks acknowledgements. Preferably the data cells are checked for errors using a Cyclic Redundancy Check (CRC).

According to a particularly preferred embodiment of the crossbar switch according to the invention, means to use the control channel links to relay acknowledgements between the port cards comprise a split and steer unit within the control unit which splits the fused and piggybacked acknowledgements and transmits the split acknowledgements to the corresponding sending port cards via control channel links.

A split and steer unit preferably comprises means to use a hybrid data steering binary tree for an N×M asymmetric switch, wherein said means to use a hybrid data steering binary tree comprise a first and remaining stages with a first stage consisting of M/2 2:1 multiplexers and the remaining $\log_2$ (M)−1 stages consist of AND gates, such that N such trees exist corresponding to each of the N input ports in the crossbar switch, each of the N trees has M inputs, with each tree input consisting of sequence numbers and source port indent numbers (IDs) from corresponding acknowledgements.

Further embodiments of the invention cover elements in a crossbar switch to piggyback acknowledgements on control channel cells, split combined acknowledgements and steer discrete acknowledgements to required sending ports, and match acknowledgements to data cells in sending port cards waiting for corresponding acknowledgements.

BRIEF DESCRIPTION OF THE DRAWINGS

The foregoing, together with other objects, features, and advantages of this invention can be better appreciated with reference to the following specification, claims and drawings.

DETAILED DESCRIPTION OF THE INVENTION

Figure 1:
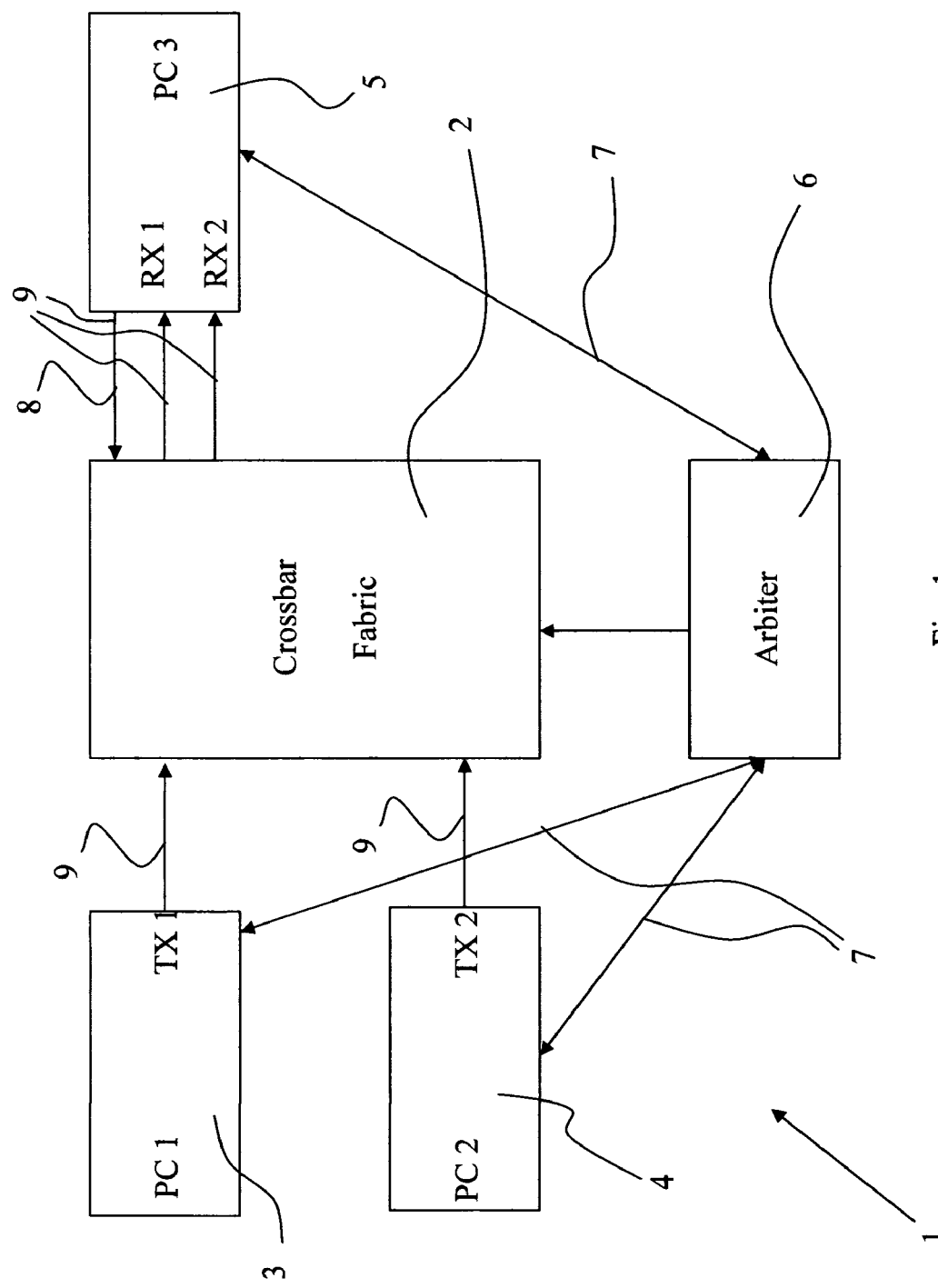
FIG. 1 showing a crossbar switch according to the state of the art.
Figure 2:
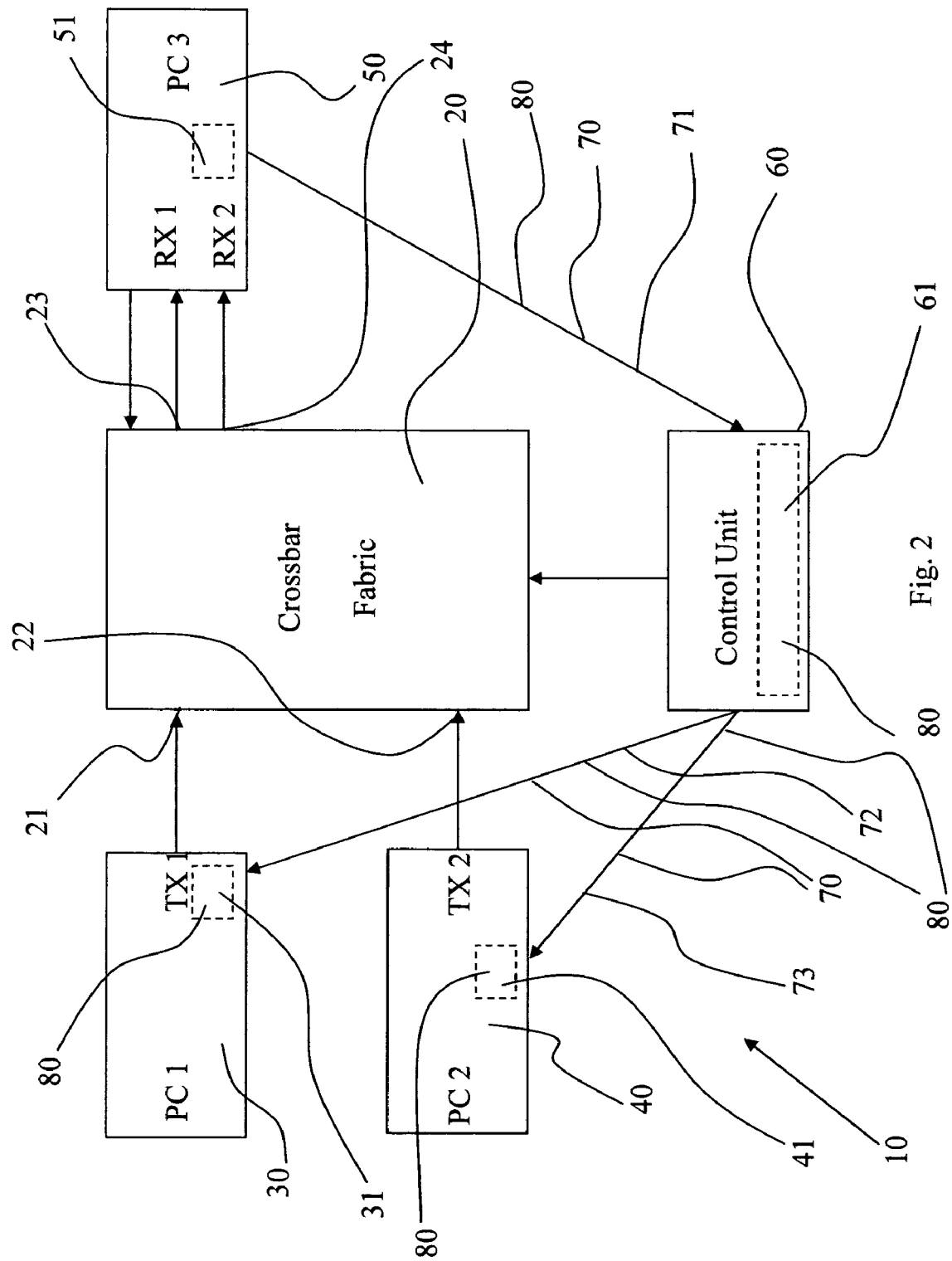
FIG. 2 showing a crossbar switch according to the invention.

A crossbar switch 10 as shown in FIG. 2 to switch data cells or data packets in an interconnection network comprises a crossbar fabric 20 with two sending ports 21, 22 and two receiving ports 23, 24, with sending port cards 30, 40 connected to one sending port 21, 22 each and one receiving port card 50 coupled to the receiving ports 23, 24. The crossbar switch 10 further comprises a control unit 60 connected with the port cards 30, 40, 50 via discrete control channel links 70 that are preferably independent of the crossbar fabric 20. The two receiving ports 23, 24 are clustered on the single receiving port card 50 so that this receiving port card 50 in a single cycle defined by a time step can receive two data cells from the two sending port cards 30, 40 simultaneously. Those data cells shall be acknowledged simultaneously within the same cycle in order to reduce buffer space at the sending port cards 30, 40 by allowing the receiving port card 50 to acknowledge data cells received from different sending port cards 30, 40 within the same cycle. The buffer space within each sending port card 30, 40 stores each data cell sent until an acknowledgement is received. The crossbar switch 10 further comprises means 80 to use the control channel links 70 to relay acknowledgements between the receiving port card 50 and the sending port cards 30, 40 in order to provide an increased bandwidth for transmitting data cells or data packets via said crossbar fabric 20.

Within the crossbar switch 10, both sending port cards 30, 40 can transmit data cells via the crossbar fabric 20 by their transceivers TX1, TX2, that can function as transmitters, to the receivers RX1, RX2 respectively on the receiving port card 50 in the same cycle or time-step. The sending port cards 30, 40 comprise a reliable delivery queue (RDQ) and acknowledgement match unit 31, 41 each, in which unacknowledged data cells are saved. A fuse and forward unit 51 on the receiving port card 50 fuses the acknowledgements corresponding to data cells on receivers RX1 and RX2 and piggybacks them on the control channel link 71. An acknowledgement is generated for every data channel cell received in a given cycle or time-step. A split and steer unit 61 integrated in the control unit 60 splits the fused acknowledgements and forwards them to the sending port cards 30, 40 via the control channel links 72, 73 respectively. After receiving the acknowledgements, the sending port cards 30, 40 remove the corresponding data cell from the buffer space.

According to this embodiment of the invention the means 80 to use the control channel links 70 to relay acknowledgements between the receiving port card 50 and the sending port cards 30, 40 are established by the fuse and forward unit 51, the split and steer unit 61 and the reliable delivery queue and acknowledgement match units 31, 41.

Figure 3:
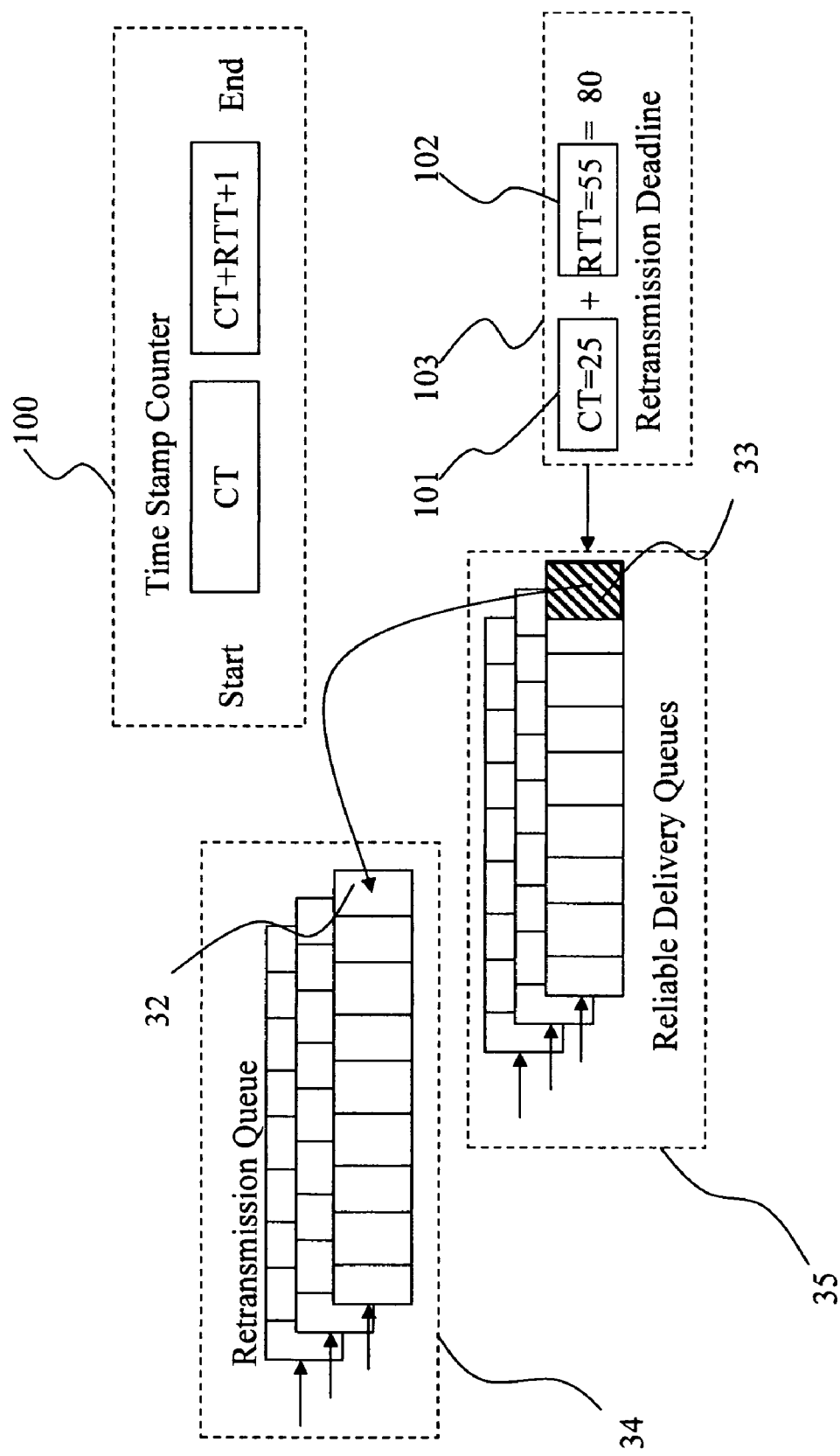
FIG. 3 showing a scheme of the steps performed in a reliable delivery queue and acknowledgement match unit according to the invention, FIG. 4 showing a fuse and forward unit according to the invention, FIG. 5 showing a split and steer unit according to the invention, and FIG. 6 showing a hybrid data steering tree in a split and steer unit according to the invention.

The functionality of the reliable delivery queue and acknowledgment match units 31, 41 (FIG. 2) is depicted in FIG. 3. On each sending port card 30, 40 there are as many reliable delivery queues (RDQ) 35 as output ports in the crossbar switch 10. There is a single reliable delivery queue and acknowledgment match unit 31, 41 (FIG. 2) on a particular sending port card that serves all the RDQs 35. The RDQ 35 and the reliable delivery queue and acknowledgment match units 31, 41 (FIG. 2) are implemented on each sending port card 30, 40 (FIG. 2) in a control channel link management block. A timestamp counter 100 is incremented on each data channel cell slot, wherein each slot represents a time-step to signify the progress of time. After a data cell is transmitted, a descriptor 32 corresponding to the transmitted data cell is placed in the retransmission queue 34. Simultaneously a descriptor 33 corresponding to the entry placed in the retransmission queue 34 is placed in the RDQ 35. This descriptor 32 carries the sum of the current time (CT) 101 and round trip time (RTT) 102 for each data cell as its retransmission deadline 103. Every cycle a comparator compares the head-of-line entry in the RDQ 35 with the timestamp counter 100. Thereby in a given time-step or cycle only one data cell is sent by a sending port to a receiving port so that head of line entries across RDQs 35 form a sorted list. If the timestamp counter 100 shows a time that matches the deadline entry in the head-of-line descriptor 35 and an acknowledgement corresponding to the descriptor 33 is not present in the control channel link input, an acknowledgement retransmission policy is used for retransmission. This policy can either be go-back-N or selective-retry.

In an embodiment of the present invention, go-back-N is used for crossbar switches with optical data channels consistent with burst errors usually seen on optical links. In addition, a mismatch in sequence numbers between an acknowledgement received on the control channel link from an output port and the corresponding descriptor entry in the RDQ 35 for a particular output port can trigger a retransmission. This corresponds to the situation where data channel cells or control channel cells are lost or found to be in error.

In an embodiment of the present invention, an additional pointer is maintained in each RDQ 35 and the required retransmission queue descriptor 32 is provided to the port-card transmitter for retransmission. This can be efficient for selective-retry schemes.

In another embodiment of the present invention, the whole error control window comprising the sequence numbers between last acknowledged sequence number and current data cell sequence number for a given queue i.e. output port is transferred to a queue by block copying. This is efficient for go-back-N schemes.

According to an embodiment of the invention an acknowledgement received for a particular data cell can preempt a retransmission in progress. This is especially useful for go-back-N. A deadline elapse can trigger a go-back-N retransmission. If the acknowledgements for subsequent data cells arrive in proper form and order, these acknowledgements can interrupt and squash the retransmission of descriptors 32 from the retransmission queue 34. This allows bandwidth to be saved.

In an exemplary embodiment of the present invention as described with reference to FIG. 3 a data cell is transmitted and a descriptor 32 corresponding to the data channel cell is placed in the retransmission queue 34. Simultaneously, a descriptor 33 corresponding to the entry placed in the retransmission queue 34 is placed in the RDQ 35. This descriptor entry carries the value eighty stored from the current time CT=25 time units and the round-trip time RTT=55 time units. Assuming that time elapses to CT+RTT=80 time units and the corresponding acknowledgement does not arrive, retransmission of the whole error control window for go-back-N or just the current data cell for selective retry will be triggered at the $81^{st}$ time unit i.e. CT+RTT+1.

According to a further embodiment of the invention the receiving port card 50 can be fitted with a RDQ and with an acknowledgment match unit as well if the receiving port card 50 is foreseen to also send data cells via said crossbar fabric 20 (FIG. 2).

Figure 4:
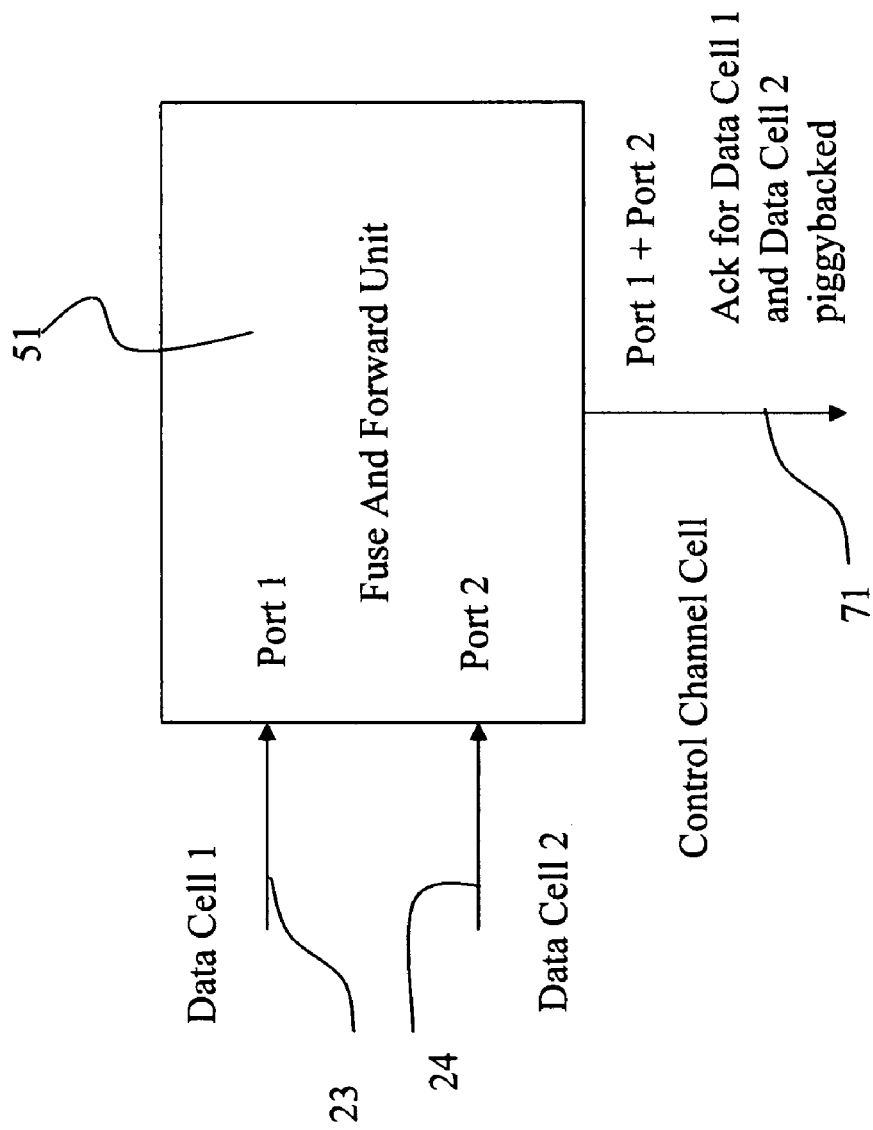

FIG. 4 shows a fuse and forward unit 51 integrated on a receiving port card 50 (FIG. 2). Each receiving port card 50 has a number of C co-located receivers RX1, RX2 etc. Every cycle the fuse and forward unit 51 creates acknowledgements from multiple receivers RX1, RX2 by extracting sequence number and port ID information from incoming data cells. This information is then embedded, piggybacked and forwarded via the control channel link 71 to all receivers TX1, TX2 of the sending port cards 30, 40 in the same cycle or time-step. In an exemplary embodiment of the present invention shown in FIG. 4, sequence numbers and port IDs are extracted from data channel cells on a first port 23 and a second port 24 and transmitted on the control channel link 71.

Figure 5:
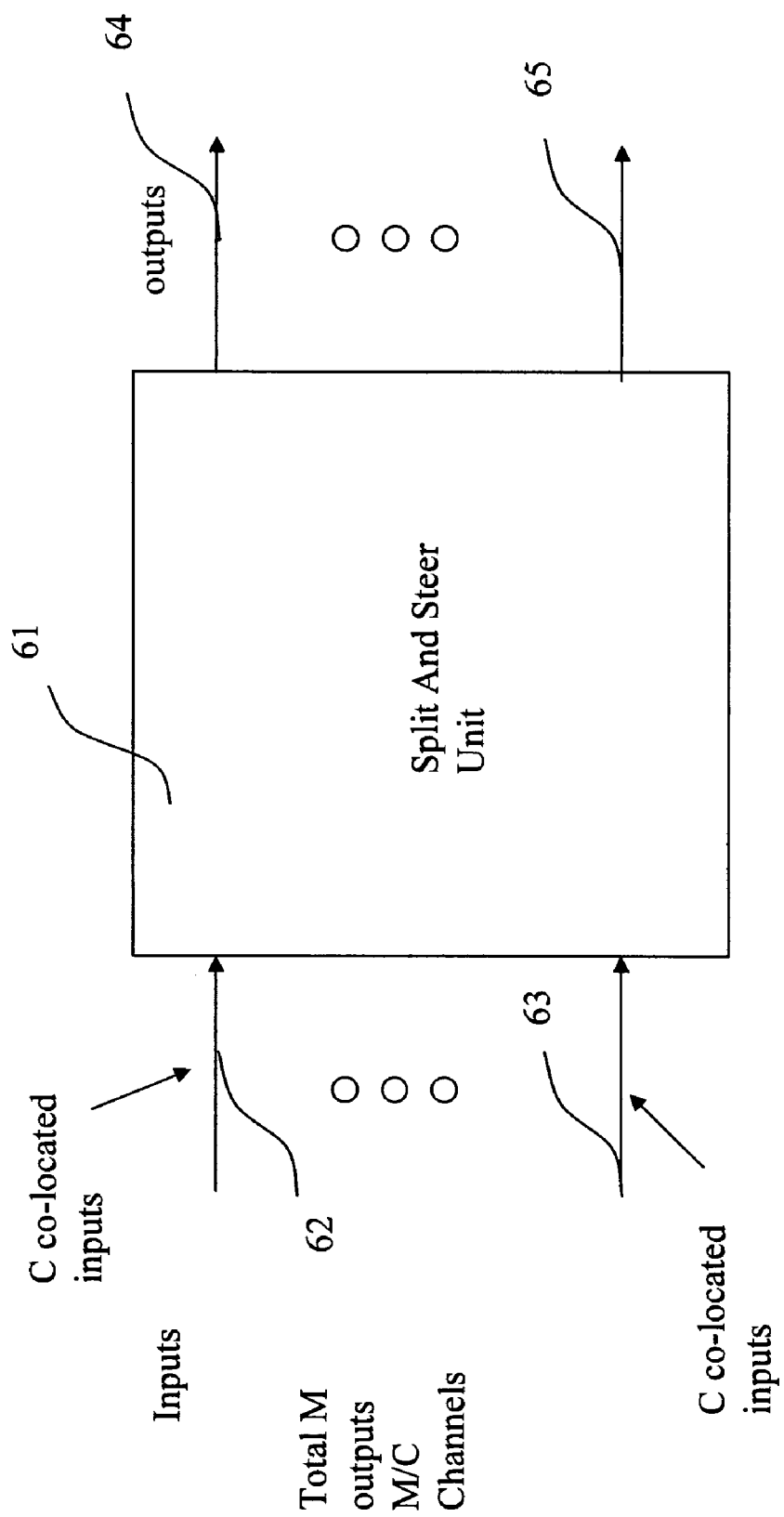

A split and steer unit 61 shown in FIG. 5 receives inputs e.g., 62, 63 from each M/C cluster ports. In an exemplary embodiment, M/C can be set to the number of input ports N. In another exemplary embodiment, for a N×M switch with N=64, M=128 and C=2 yields a 64×(128/2) switch. The fused acknowledgements are then split and steered to the corresponding sending port (e.g. outputs 64, 65 of FIG. 5). This is possible because the fused acknowledgements from the receiver port card carry the sequence number of the corresponding data cell along with the port ID of the sender. In an embodiment of the present invention, all the port cards are tied to a single clock supplied from the central control unit 60 (FIG. 2). In this case, a sending port card 30, 40 can only transmit a single data cell to the receiving port-card 50 in a given cycle or time-step. This means that in a given cycle, only one acknowledgement can be destined to a given sending port card from the receiving port-card 50. This allows the split and steer unit 61 to be constructed as N multiplexers, one for each input port. Each multiplexer multiplexes M output ports to a given input port, i.e. is a M:1 multiplexer. The multiplexer steers the acknowledgement corresponding to a given input port. For an N×M switch, there are N such multiplexers.

The potentially large M:1 multiplexer can be implemented as a tree of 2:1 multiplexers. The first stage may have M/2 2:1 multiplexers and there may be $\log_2$ (M) stages in the tree of 2:1 multiplexers. This helps to keep wires short and leads to a high speed hardware implementation.

In an embodiment of the present invention, with all port cards tied to a single clock from the control unit 60, in a given cycle, any given sending port can receive only one acknowledgement from a receiver in a given time step. Consequently, the first stage can use 2:1 multiplexers, while for other stages, 2:1 multiplexers are replaced by AND gates. In other words, the decision about whether a given tree input corresponds to an input port is already resolved in the first stage and subsequent stages are used only to propagate values to the root of a hybrid data steering tree.

Figure 6:
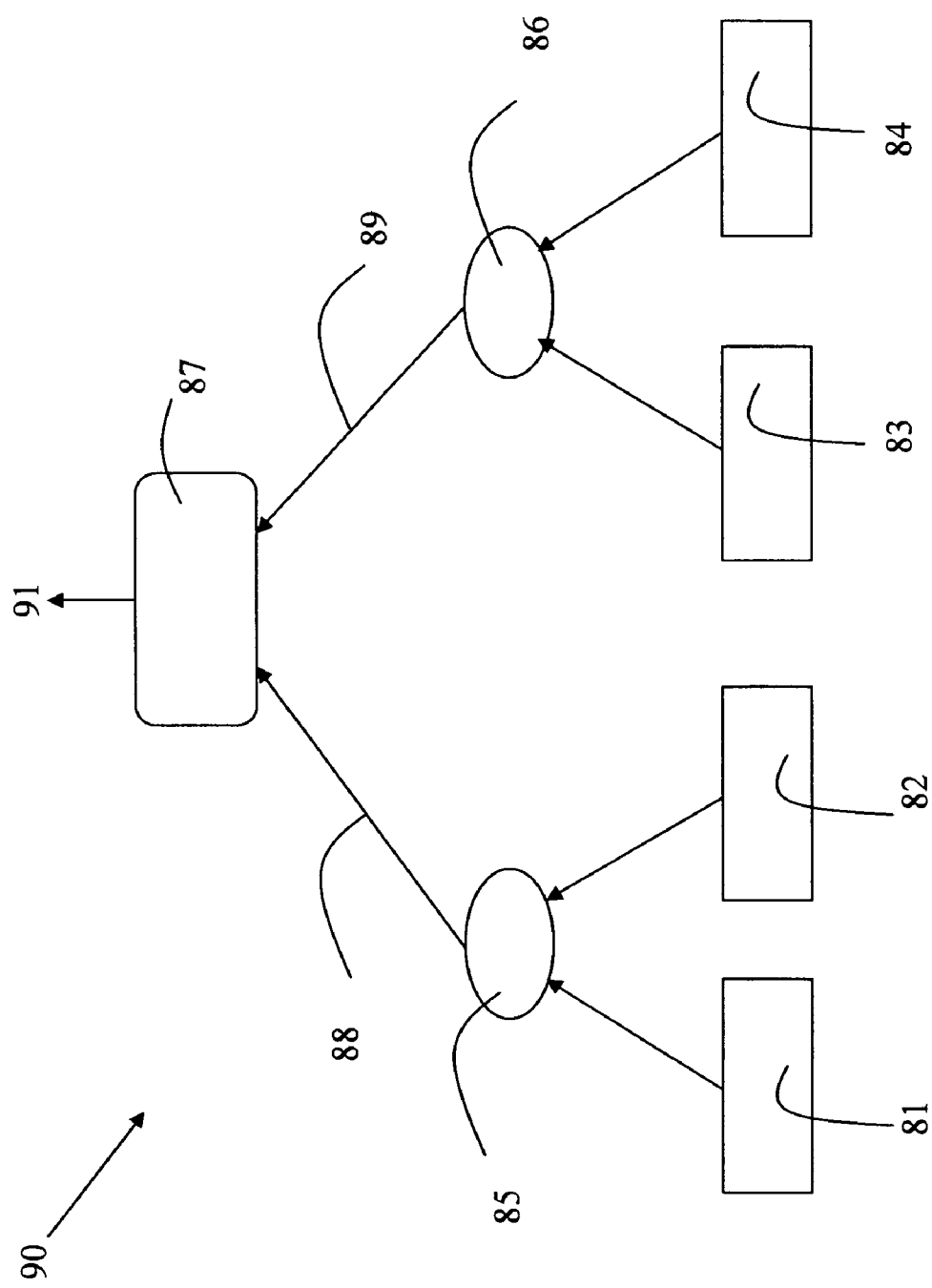

According to an embodiment of the present invention shown in FIG. 6, in a split and steer unit 61 with four output ports, a hybrid data steering tree 90 corresponds to a given input port I=2. It has 4/2=2 comparators 85 and 86, $\log_2$ (4)=2 stages of operators 85, 86 and 87. Sequence numbers and port IDs of each acknowledgement corresponding to a receiver port M are applied to each of the inputs 81, 82, 83 and 84. The port IDs at each input 81, 82, 83 and 84 are compared pairwise with the port ID=2 since there are M=4 such trees. If a match is found, then the inputs 81, 82, 83 and 84 are propagated through to the output 91. Input 81 contains a value of port ID equal to '2'. There is one and only one port that can send a data cell in a given time-step as established earlier, so the matching entry of the input 81 regarding sequence number and port ID is transferred along the branch 88. A boolean value with all bits set to '1' is consequently transferred along the branch 89 as the comparison in the comparator 86 would not have matched, wherein the comparator 85 already found a match. The operator 87 performs an AND operation and the value of the input 81 observed at the root of the tree 90 contains the sequence number and port ID of the data cell that was acknowledged successfully by the receiver port card 50 and destined to the input port I=2.

The present invention may use hop-by-hop reliability to allow modifications to packet headers. The present invention may work in conjunction with end-to-end reliability and retransmission policies.

While the present invention has been described in detail, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

The invention claimed is:

1. A crossbar switch comprising:
   a crossbar fabric having N sending and M receiving ports, wherein N and M are integers;
   at least one sending port card coupled to one or more sending ports, each sending port card comprising buffer space for storing sent data cells until an acknowledgement is received;
   at least one receiving port card coupled to one or more receiving ports;

at least one control unit coupled to the at least one sending and at least one receiving port cards via discrete control channel links, and link control means to use the discrete control channel links to relay C acknowledgements simultaneously between at least one receiving port card and at least one sending port card, wherein C is a clustering factor and C receiving ports are clustered on a single receiving port card so that such a receiving port card in a single time-step can receive up to C data cells from C sending port cards simultaneously, wherein said link control means to use the discrete control channel links to relay acknowledgements between the at least one sending and at least one receiving port cards comprises a reliable delivery queue (RDQ) and acknowledgement match unit on each sending port card to process an acknowledgement received at a sending port card, to trigger retransmissions, and to provide information about acknowledged data cells, and wherein each RDQ entry stores a retransmission deadline based on a sum of a current time and a round-trip time, wherein the retransmission is triggered when at least one of the current time exceeds the retransmission deadline and a sequence number of an acknowledgement on the control channel link mismatches with a sequence number of a corresponding head-of-line descriptor in the RDQ.

2. A crossbar switch comprising:

a crossbar fabric having N sending and M receiving ports, wherein N and M are integers;

at least one sending port card coupled to one or more sending ports, each sending port card comprising buffer space for storing sent data cells until an acknowledgement is received;

at least one receiving port card coupled to one or more receiving ports;

at least one control unit coupled to the at least one sending and at least one receiving port cards via discrete control channel links, and link control means to use the discrete control channel links to relay C acknowledgements simultaneously between at least one receiving port card and at least one sending port card, wherein said link control means comprises a split and steer unit within a control unit which splits fused and piggybacked acknowledgements and transmits discrete split acknowledgements to the corresponding sending port cards via control channel links, wherein C is a clustering factor and C receiving ports are clustered on a single receiving port card so that such a receiving port card in a single time-step can receive up to C data cells from C sending port cards simultaneously, and wherein said split and steer unit comprises means to use a hybrid data steering binary tree for an N×M asymmetric switch, wherein said means to use a hybrid data steering binary tree comprises a first and remaining stages with a first stage consisting of M/2 2:1 multiplexers and remaining $\log_2(M)-1$ stages consist of AND gates, such that N trees exist corresponding to each of N input ports in the crossbar switch, each of the N trees having M inputs, wherein N and M are the same integers as for the sending and receiving ports, with each tree input consisting of sequence numbers and source port identification numbers from corresponding acknowledgements.

3. A method to operate a crossbar switch comprising a crossbar fabric with N sending and M receiving ports, wherein N and M are integers, with at least one sending port card coupled to one or more sending ports and at least one receiving port card coupled to one or more receiving ports, said crossbar switch further comprising a control unit coupled to the port cards via discrete control channel links, wherein C receiving ports are clustered on a single receiving port card, where C is a clustering factor, comprising steps of:

receiving, in a receiving port card in a single time-step up to C data cells from C sending port cards simultaneously, relaying, at control channel links up to C acknowledgements between at least one receiving port card and at least one sending port card simultaneously; and storing, in a buffer space on each sending port card each data cell sent until an acknowledgement is received, wherein each sending port card comprises a reliable delivery queue (RDQ) and acknowledgement match unit for processing an acknowledgement received at a sending port card, for triggering retransmissions, and for providing information about acknowledged data cells, and further comprising each RDQ entry storing a retransmission deadline based on a sum of a current time and a round-trip time, and wherein the method further comprises triggering retransmission when at least one of the current time exceeds the retransmission deadline and a sequence number of an acknowledgement on a discrete control channel link mismatches with a sequence number of a corresponding head-of-line descriptor in the RDQ.

4. A method to operate a crossbar switch comprising a crossbar fabric with N sending and M receiving ports, wherein N and M are integers, with at least one sending port card coupled to one or more sending ports and at least one receiving port card coupled to one or more receiving ports, said crossbar switch further comprising a control unit coupled to the port cards via discrete control channel links, wherein C receiving ports are clustered on a single receiving port card, where C is a clustering factor, comprising steps of:

receiving, in a receiving port card in a single time-step up to C data cells from C sending port cards simultaneously, relaying, at control channel links up to C acknowledgements between at least one receiving port card and at least one sending port card simultaneously;

storing, in a buffer space on each sending port card each data cell sent until an acknowledgement is received;

wherein said relaying comprises piggybacking at least one acknowledgement from a receiving port card to at least one sending port card on the control channel link directly on a control channel cell in the same time-step and splitting each piggybacked acknowledgement into discrete acknowledgements after a piggybacked acknowledgement has been sent from a receiving port card and before forwarding discrete acknowledgements to the corresponding sending port cards, and wherein said splitting comprises using a hybrid data steering binary tree for an N×M asymmetric switch such that N trees exist corresponding to each of N input ports in the crossbar switch, each of the N trees having M inputs, wherein N and M are the same integers as for the sending and receiving ports, with each tree input consisting of sequence numbers and source port identification numbers from corresponding acknowledgements.

* * * * *

UNITED STATES PATENT AND TRADEMARK OFFICE
CERTIFICATE OF CORRECTION

PATENT NO.         : 7,978,690 B2                                            Page 1 of 1
APPLICATION NO.    : 12/079854
DATED              : July 12, 2011
INVENTOR(S)        : Francois Abel et al.

It is certified that error appears in the above-identified patent and that said Letters Patent is hereby corrected as shown below:

In the Specification

At Column 1, line 1, insert the following:

--GOVERNMENT RIGHTS

This invention was made with Government support under Contract No.: NB527064 awarded by the Department of Energy. The Government has certain rights in this invention.--

Signed and Sealed this
Twentieth Day of May, 2014

Michelle K. Lee
*Deputy Director of the United States Patent and Trademark Office*